UNITED STATES PATENT OFFICE.

ANDRUS P. BOUTON, OF SAN FRANCISCO, CALIFORNIA, ASSIGNOR OF ONE-HALF TO WILLARD B. FARWELL, OF SAME PLACE.

DISINFECTANT.

SPECIFICATION forming part of Letters Patent No. 341,091, dated May 4, 1886.

Application filed September 24, 1885. Serial No. 178,104. (No specimens.)

*To all whom it may concern:*

Be it known that I, ANDRUS P. BOUTON, a citizen of the United States, residing at the city and county of San Francisco, and State of California, have invented a new and useful Composition of Matter to be Used as a Disinfectant, of which the following is a specification.

My composition consists of twenty per cent. chloride of aluminium, ten per cent. hydrate of barium, and seventy per cent. permanganate of potash, mixed together, and then dissolved in twenty per cent. of water. The composition is odorless and harmless, and its action is instantaneous. It is applied by sprinkling or pouring or exposing it in open plates or vessels, or using it in any way in which disinfectants are now used.

Of the ingredients above mentioned, each is a disinfectant in itself. The chloride of aluminium has great oxidizing-power, having the property of instantaneously decomposing. The hydrate of barium has the same effect as dry earth, and has great oxidizing and decomposing properties. The permanganate of potash acts instantaneously upon all decomposing animal and vegetable fiber by rapidly yielding oxygen. Hence the whole composition is, as I have previously mentioned, instantaneous in its action.

I am aware that permanganate of potash has been used with certain chlorides for disinfecting purposes, and such I do not claim, broadly, as my invention.

Having thus described my invention, what I claim as new, and desire to secure by Letters Patent, is—

The herein-described composition of matter, to be used as a disinfectant, consisting of chloride of aluminium, hydrate of barium, and permanganate of potash, mixed together in the proportions substantially as specified, and dissolved in water, substantially as herein described.

In witness whereof I have hereunto set my hand.

ANDRUS P. BOUTON.

Witnesses:
A. H. EVANS,
DANIEL CLARK.